United States Patent
Karpisek

(10) Patent No.: US 6,273,667 B2
(45) Date of Patent: Aug. 14, 2001

(54) APPARATUS FOR INVERTING CONTAINERS

(76) Inventor: Ladislav Stephan Karpisek, 86 Woodfield Boulevarde, Caringbah, New South Wales 2229 (AU)

( * ) Notice: Subject to any disclaimer, the term of this patent is extended or adjusted under 35 U.S.C. 154(b) by 0 days.

(21) Appl. No.: 09/734,060

(22) Filed: Dec. 11, 2000

Related U.S. Application Data

(62) Division of application No. 09/543,130, filed on Apr. 5, 2000, which is a continuation of application No. 09/269,257, filed as application No. PCT/AU97/00635 on Sep. 25, 1997, now abandoned.

(30) Foreign Application Priority Data

Sep. 25, 1996 (AU) .................................................... P02532

(51) Int. Cl.[7] .................................................. B65G 65/23
(52) U.S. Cl. .......................... 414/425; 414/420; 414/768; 414/773
(58) Field of Search ..................... 414/414, 419, 414/420, 421, 425, 492, 810, 758, 759, 768, 773, 816; 222/185.1

(56) References Cited

U.S. PATENT DOCUMENTS

| | | | | |
|---|---|---|---|---|
| 2,928,562 | * | 3/1960 | Gollnick | 414/425 X |
| 3,220,584 | * | 11/1965 | Swanson | 414/420 |
| 3,580,408 | * | 5/1971 | Newton | 414/425 X |
| 3,658,199 | * | 4/1972 | Owen | 414/425 |
| 3,679,077 | * | 7/1972 | Gennick | 414/425 X |
| 4,948,324 | * | 8/1990 | Niederer | 414/420 X |
| 4,963,070 | * | 10/1990 | Detrick | 414/492 |
| 5,147,170 | * | 9/1992 | Detrick | 414/492 |
| 5,971,219 | * | 10/1999 | Karpisek | 222/185.1 |

FOREIGN PATENT DOCUMENTS

| | | | | |
|---|---|---|---|---|
| 2137159 | * | 10/1984 | (GB) | 414/425 |
| 2195975 | * | 4/1988 | (GB) | 414/420 |

* cited by examiner

Primary Examiner—Robert P. Olszewski
Assistant Examiner—Gerald J. O'Connor
(74) Attorney, Agent, or Firm—Edwin D. Schindler

(57) ABSTRACT

A container turn-over apparatus (1) including a base (2) and a container cradled (3) with openable latchable ends (8,9) and an open side (6) to allow a container to be placed in the cradle (3). Two selectively engagable spaced apart pivotal connections (12,14 & 13,15) allow the cradle (3) to be turned end over by means of piston and cylinder assemblies (44). When the cradle (3) is turned over to stand on one of its ends (8,9) the other end of the cradle (3) is automatically unlatched and opened.

15 Claims, 5 Drawing Sheets

APPARATUS FOR INVERTING CONTAINERS

This is a continuation-in-part of application Ser. No. 09/543,130, filed Apr. 5, 2000, which, in turn, is a continuation of application Ser. No. 09/269,257, filed Mar. 19, 1999, now abandoned as the U.S. National Phase application, pursuant to 35 U.S.C. §371, of P.C.T. Application No. PCT/AU97/00635, filed Sep. 25, 1997.

FIELD OF THE INVENTION

This invention is concerned generally with apparatus to invert an open topped container to allow the container to be discharged through the open top.

BACKGROUND TO THE INVENTION

Whilst the invention has been devised with containers in mind which are of the type which comprise a pallet or base to which there is mounted four interlocked sides the invention is not limited to such containers.

When containers are to be emptied the methods adopted depend to a large extent on the contents of the container. In the case of flowable material, such as granules, gravitational discharge is the preferred method. To facilitate this method of emptying a container attempts have been made to develop containers which have bottom discharge means. For a number of reasons containers with a bottom discharge incorporated in the base or pallet forming part of the container have not found favour with users.

An alternative is to tilt the container, usually in a tilting device on which the container is mounted, to the extent required to cause the contents to flow from the container over a top edge of one of the container sides. To provide a generally uniform rate of discharge, which is the normal requirement, the tilt of the container has to be continually adjusted. This discharge method is labour and/or time intensive and is therefore not favoured.

Another discharge method is to mount a hood with a discharge opening, and usually fitted with a flow controlling device, to the open top of the container and then support the container in an inverted condition to allow material within the container to gravity discharge through the discharge opening of the hood. The challenge with this method is how to invert the container/hood assembly, hereinafter termed 'a container', in the most efficient and economical manner. The present invention addresses this challenge.

SUMMARY OF THE INVENTION

Broadly stated the present invention can be said to provide a container turn-over apparatus comprising a base with a first and a second spaced apart bearing means, a container cradle permanently coupled to the base by a cradle turn-over means, the cradle has a first and a second spaced apart bearing means engagable respectively with the first and second bearing means on the base to provide two pivotal connections between the base and the cradle allowing said turn-over means to invert the cradle from a first position where a first end of the cradle is ground engaging to a second position where a second end of the cradle is ground engaging, said cradle has an open side to allow a container to be placed in the cradle and has supports to support a container whilst it is inverted.

Figure 1:
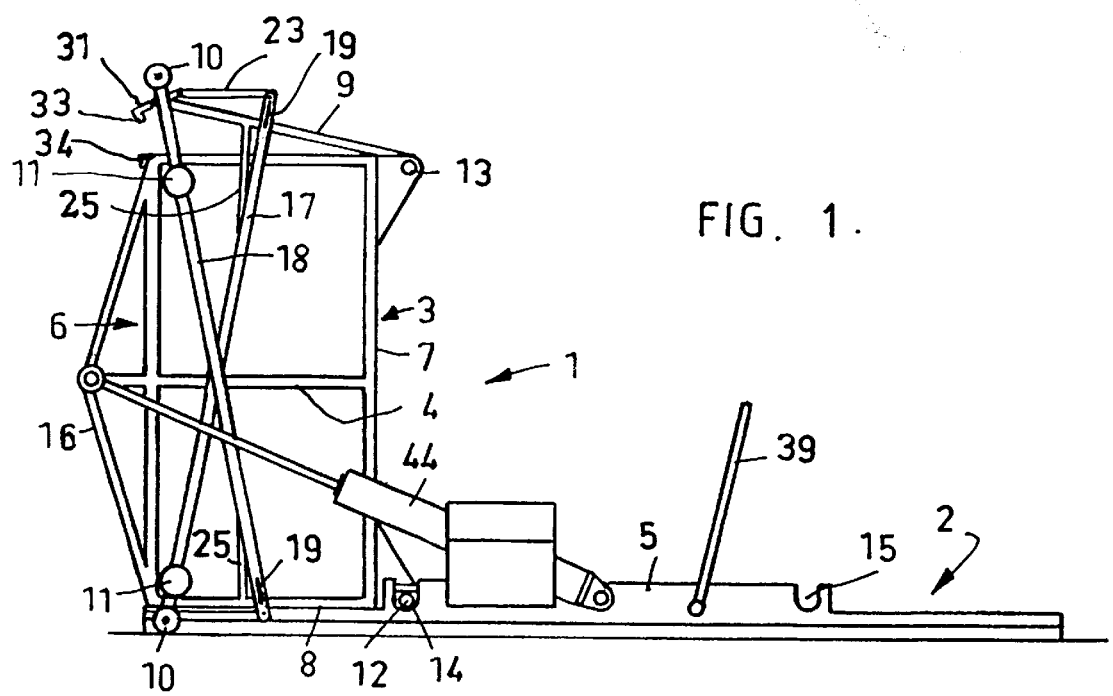
FIG. 1 is a schematic side view of the apparatus with an end cover open to allow a container to be loaded into the container support.

DETAILED DESCRIPTION OF THE PREFERRED EMBODIMENT.

The illustrated turn-over apparatus, indicated generally as 1, includes a base 2 with a container support cradle indicated generally 3, hereinafter for convenience simply referred to as the cradle. The cradle 3 includes a skeletal frame of welded metal bars and with two side frames parts 4, an open front side 6 and a back part 7 and it has two end covers 8 and 9 pivotally connected to the skeletal frame at locations identified 12 and 13 respectively, which also indicate pivot pins extending from lugs on the skeletal frame. Alternatively, there can be a rod extending across the frame and projecting from both sides to provide the pivot pins.

The base 2 includes two laterally spaced rails 5 of channel form to house operating mechanisms to be described. There are laterally aligned socket pairs 14 and 15 in the rails 5. The socket pairs 14,15 are engagable by the pin pairs 12,13 as the cradle executes an end over end inversion.

Figure 2:
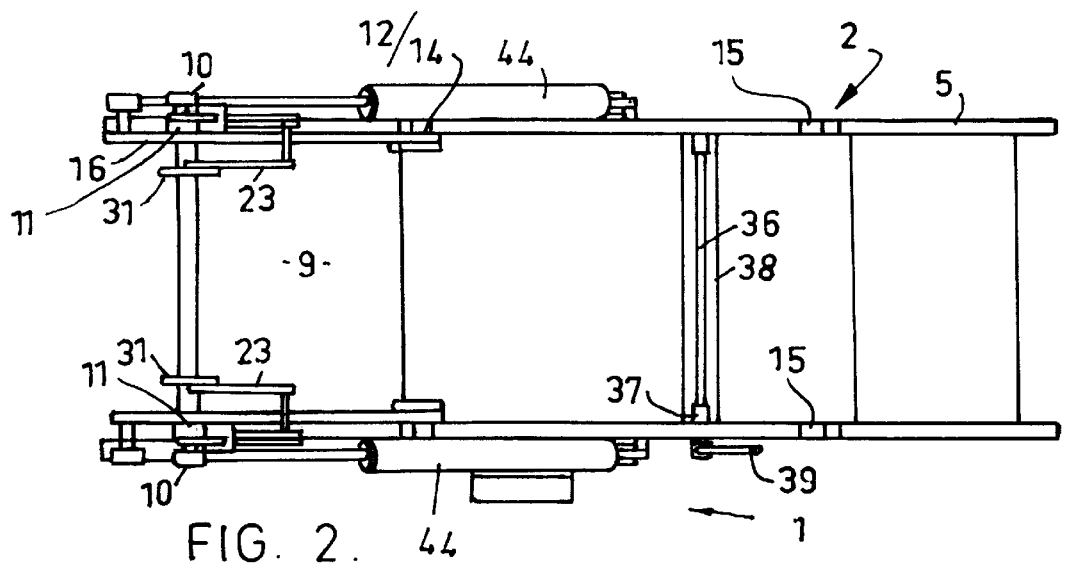
FIG. 2 is a top view of the apparatus illustrated in FIG. 1.

As illustrated in FIG. 1 the cradle 3 is resting on the end cover 8 with the pivot pins 12 engaged in the sockets 14. The width of the frame can be seen in the top view of the cradle FIG. 2.

A turn-over means comprised of two piston and cylinder assemblies 44, one on each side of the apparatus, connect the base 2 at points mid-way between the sockets 14,15 to extensions of the cradle sides 4 in the form of mounting frames 16 at the open front 6 of the cradle. The pivotal connections to the frames 16 are at the mid-length of the cradle.

Bars 17,18 are mounted at each side of the cradle. The bars 17 and 18 are slidably engaged in pivotal bearing means 11 mounted on each side the cradle frame. Each bar 17–18 has a ground engagable wheel 10 at its first end.

Members best seen in FIGS. 7 and 8 include the connections of the other ends of the bars 17 and 18 to the cradle end cover 9 and 8 respectively by pins 24 on the end covers slidable in bar slots 19 to provide a lost motion connection needed for the proper functioning of the apparatus as will be described later. Tension springs 20 connect the end cover arms 25 to the bars 17 and 18. The springs 20 are always under tension. End cover latching means is provided. It comprises arms 31 pivotally connected at 32 to the end covers 8 and 9 and adapted at first ends 33 to engage cooperating parts 34 of the cradle frame and at the other ends the arms 31 are pivotally connected to first ends of links 23 and the other ends of the links 23 are pivotally connected to the bars 17,18 as indicated 26 in FIGS. 7 and 8. The detailed interaction of these members will be explained later.

Figure 4:
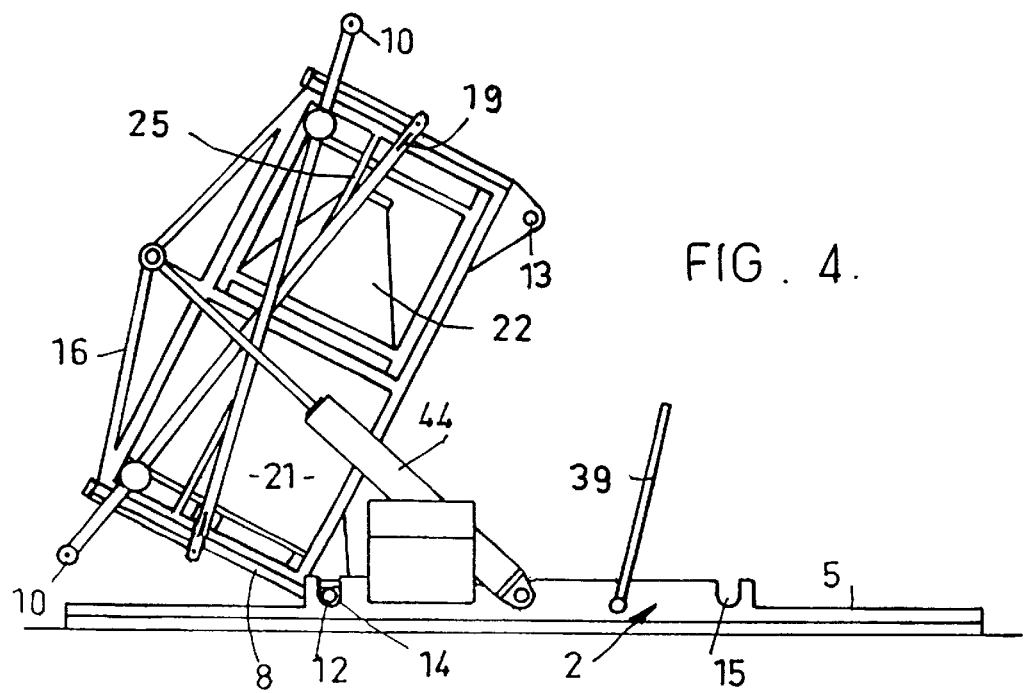
FIG. 4 is view similar to FIG. 1 after a container has been loaded into the apparatus and with the apparatus part way through a first stage of a container turn-over sequence.
Figure 3:
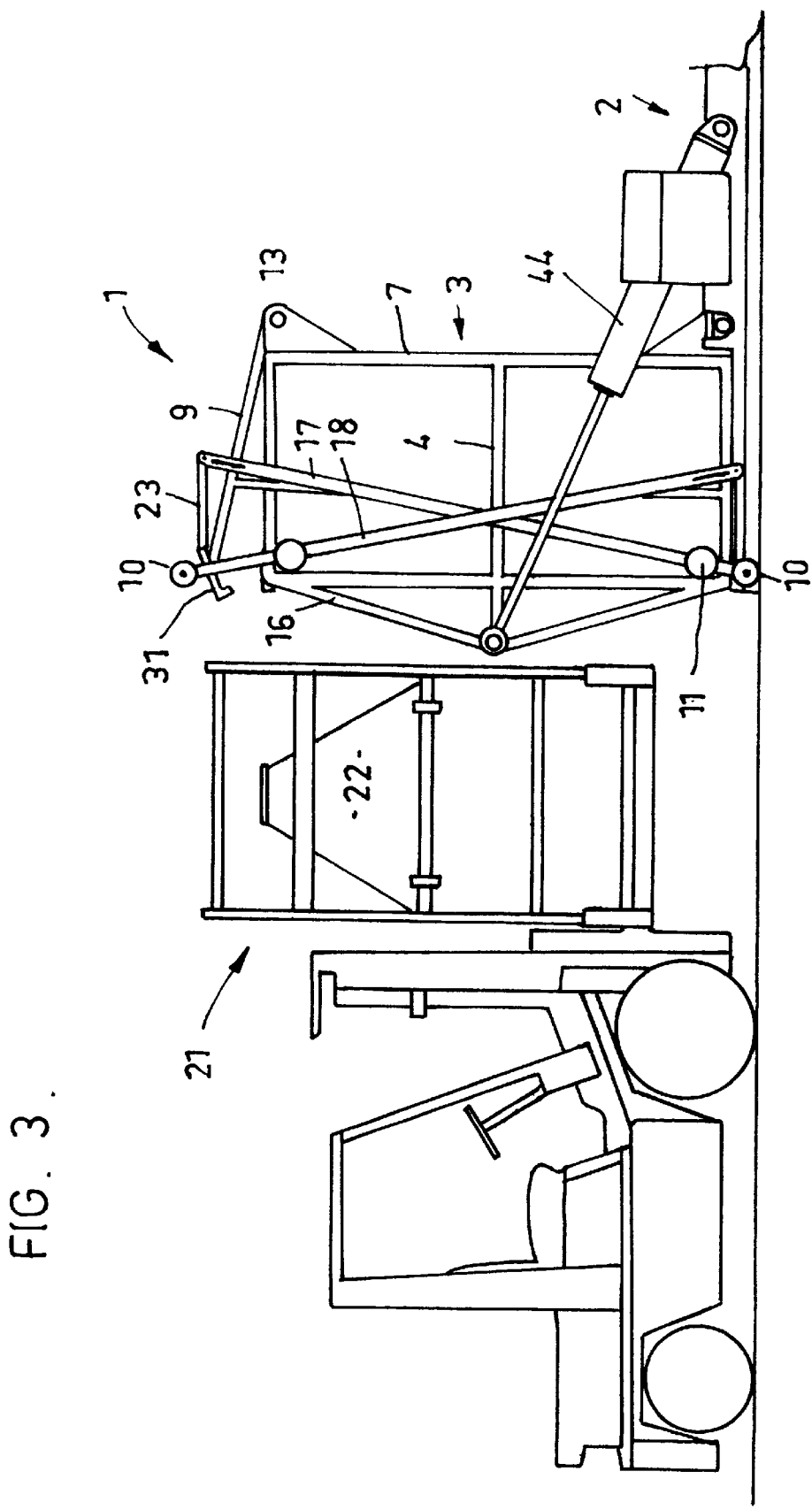
FIG. 3 is a schematic side view showing the loading of a container to be inverted into the apparatus.

In FIG. 4 a container 21 (conventionally a box comprising a base and four upstanding side walls) with a discharge hood 22 affixed is shown housed in the cradle. The spacing between the covers 8 and 9 when closed is minimally greater than the overall height of the container and hood assembly so that during an inversion sequence there will be no significant endwise movement of the container hood assembly in the cradle. The covers 8 and 9 are made openable so that there will be operating clearance for the loading of the container/hood assembly into the cradle. With the end cover 9 in the FIG. 1 open condition the container would be typically loaded into the cradle through the open front side 6 of the cradle and lowered onto the end cover 8 by means of a fork lift truck, see FIG. 3.

FIG. 4 also shows an early stage of an inversion operation, the wheel 10 of the bar 17 is free of the ground and the end cover 9 is closed and latched closed. The sequence leading to this condition is as follows. There is a contraction of the piston and cylinder units 44 and pivoting of the cradle about the connection 12–14. With the wheels 10 still bearing on the ground the bars 17 slide through the bearings 11 as the cradle tilts. The pins 24 on the end cover 9 bear on the lower ends of the slots 19 (as a result of the action of the springs 20) until such time as the end cover 9 closes onto the upper end of the cradle. At this stage further tilting of the cradle will cause the end cover pins 24 to pass along the slots 19 due to the action of the springs 20 pulling the bars 17 down as the cradle rises relative to the point of contact of the wheels 10 with the ground. The interaction of the elements 23–31 as the bars 17 move relative to the cradle causes the arms 31 to pivot about 32 and the ends 33 of the arms 31 to latchingly engage the cradle frame at 34 as the wheel 10 leaves the ground. The cradle end 9 is thus automatically latched closed at a very early stage in the cradle inversion.

Figures 5, 6:
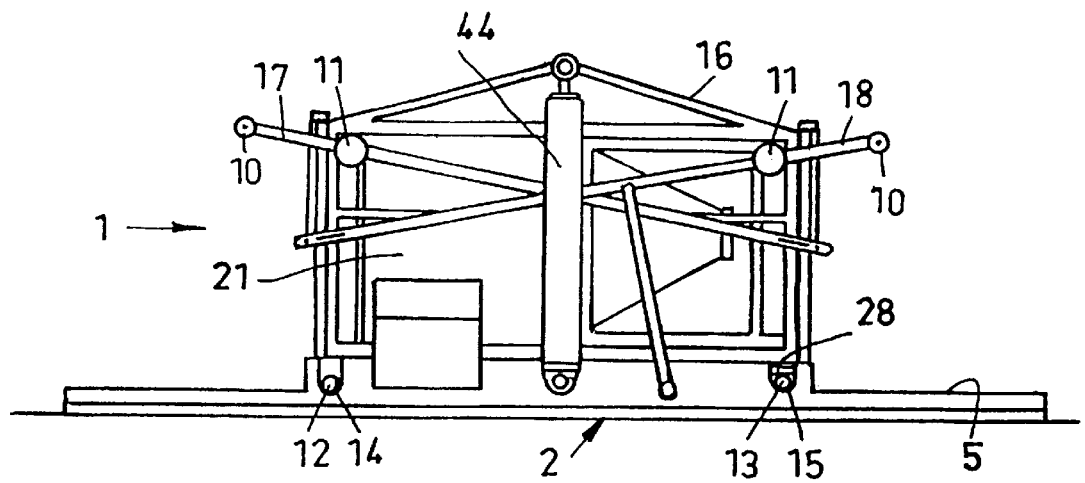
FIG. 5 is a view similar to FIG. 1 with the apparatus having completed the first stage in the container turn-over sequence and prepared for the second stage of the turn-over.
FIG. 6 is a view similar to FIG. 1 with the apparatus having completed the second stage of the container turn-over sequence and with the end cover open ready for the removal of the container.

In FIG. 5 the cradle is in the mid-position of the turn-over operation and the other pivotal connection members 13,15 are engaged and the turn-over power units 44 are fully contracted. At this stage a retaining means maintaining the connection between 12,14 is released and a like retaining means is applied to the connection 13,15, as will be described later.

In FIG. 6 the second phase of the inversion sequence is complete as a result of the operation of the turn-over hydraulic power units 44. The latching for the cradle end cover 8 has been released as a result of the initial contact of the wheels 10 of the bars 18 with the ground as the cradle approached the FIG. 6. As the tilting of the cradle is nearing the FIG. 6 condition the continued upward movement of the bars 18 will cause the lower ends of the slots 19 to engage the slot embraced pins 24 of the end cover 8 to force it to the open condition shown in FIG. 6 and further tension the springs 20. The end cover 9 now rests on the base 2, the end cover 8 is open and the container hood assembly 21–22 can be removed by a fork lift truck or the like through the open front 6 of the cradle.

Figure 7:
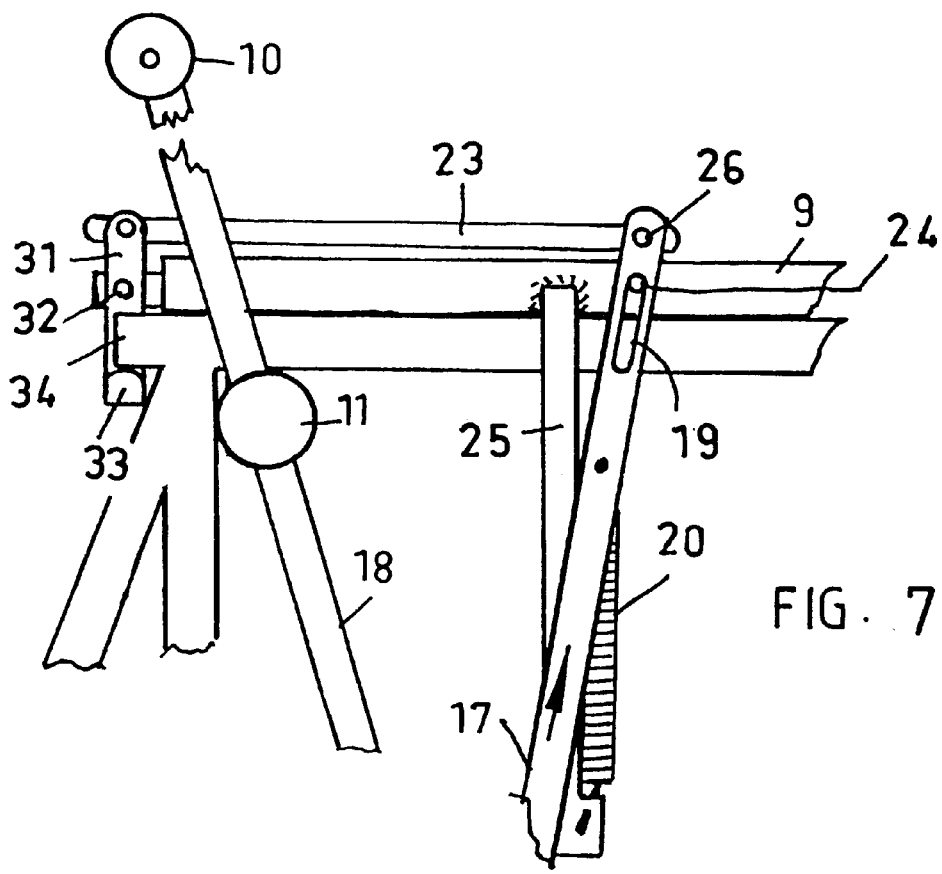
FIG. 7 is an enlarged scrap view of the latching means for retaining each of the end covers of the container support in the closed position.
Figure 8:
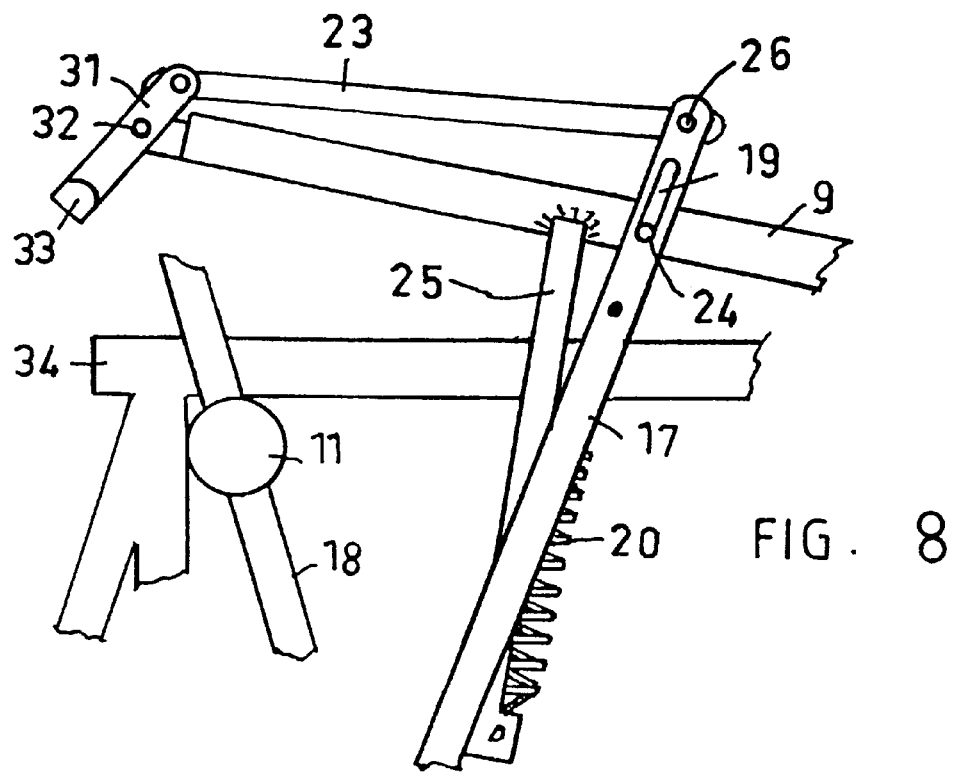
FIG. 8 is a view similar to FIG. 7 where the latching means is released and the end cover for the container support is open.

The above described interaction of elements can be seen clearly from FIG. 7 which provides an enlarged detail of the means whereby the end member 9 is latched closed and FIG. 8 which shows in detail the unlatching and lifting of the cradle end 9. The arrangement is the same for the cradle end 8.

Figure 9:
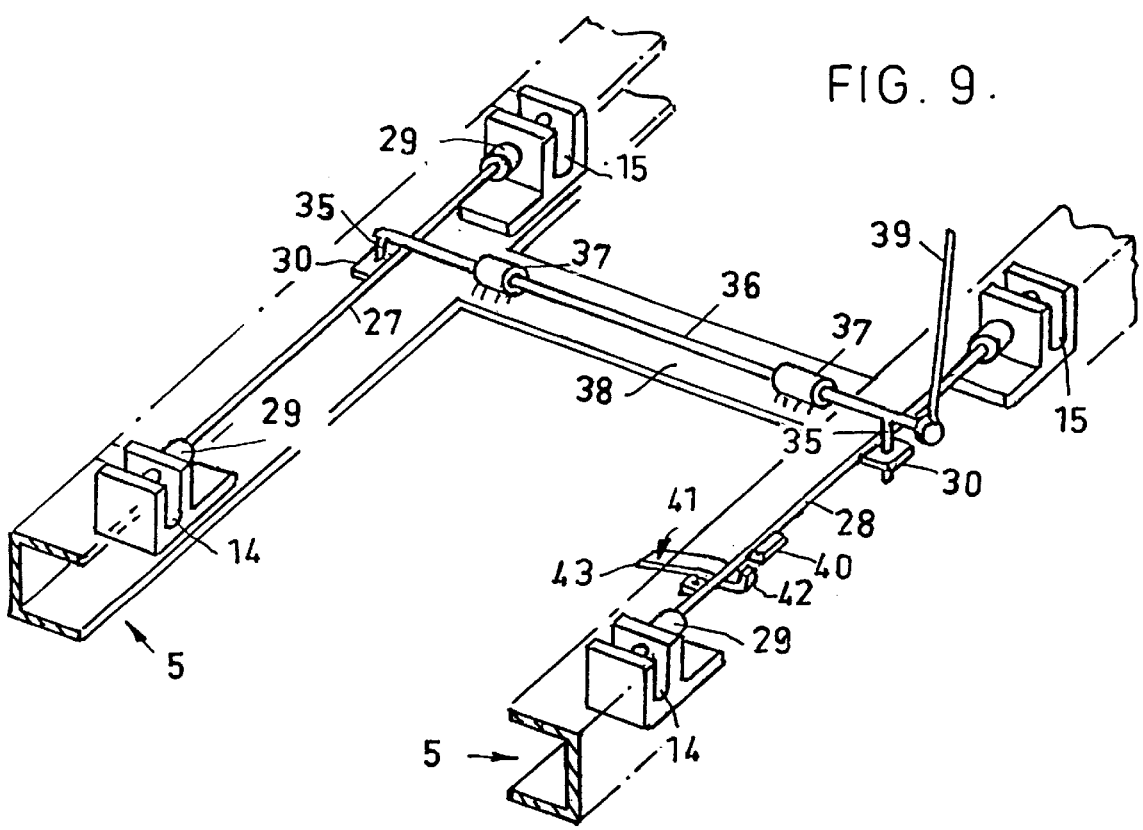
FIG. 9 is a schematic perspective view of retaining means to releasably retain pivot pins of the cradle in pin receiving sockets.

Referring now to FIG. 9, this is a diagrammatic representation of the retaining means for the pins 12,13 in the sockets 14,15. The various elements are housed in or are part of the channels forming the rails 5. In the illustrated form of the invention the sockets 14,15 are separate elements which will be aligned with cut outs in the channels 5. The retaining means comprises two bars 27,28 slidably supported in bearings 29 on the socket members 14,15 and of a length such that when extending across the sockets 15 they do not extend across the sockets 14.

The bars 27,28 are both provided with lugs 30 engaged by legs 35 fixed to a connecting shaft 36 pivotally supported in bearings 37 on a bridge member 38 between the frame rails 5. There is a handle 39 fixed to the shaft 36 whereby the bars 27,28 can be slid backwards and forwards in the bearings 29 as a result of movement transfer to the shafts through the legs 35 and lugs 30. The allows the bars 27,28 to be placed across one or other of the sockets 14,15 but not both at the same time. In this way the pin pairs 12,13 of the cradle are retained in one or the other of the socket pairs 14,15.

A security means is provided to prevent the operation of the bars 27,28 at any time except when the cradle is in the FIG. 5 position. The security means includes a lug 40 on the bar 28 and an arm 41 pivoted on the base 2. The arm 41 has an upstanding lug 42. The position of pivoting of the arm 41 is such that the portion 43 of the arm 41 will normally rest on the ground and so position the lug 42 in the path of travel of the lug 40 thereby preventing the withdrawal of the bars 27,28 (in the illustrated configuration) from the sockets 15.

When the cradle approaches the FIG. 5 position a projection (not shown) of suitable size and suitably located on the cradle will engage the lug 42 to move it out of the path of travel if the bar lug 40. This allows the bars 27,28 to be disengaged from the sockets 15 (releasing the cradle pins 13) and to be engaged with the sockets 14 (to retains the cradle pins 12 in the sockets 14). As the cradle pivots about 13–15 the lug 42 is released by the rising cradle and the weight of the arm portion 43 pivots the arm 41, the bar lug 40 is now on the other side of the arm lug 42 preventing the reverse sliding movement of the bars 27,28. As will be understood it is preferred if both bars 27 and 28 have lugs 40 for respective co-operation with the lugs 42 of two pivotal arms 41.

The foregoing is a presently preferred form of the invention. It will be understood that the construction described and illustrated could be modified without departing from the inventive concepts disclosed.

I claim:

1. A container turn-over apparatus comprising a base with a first and a second spaced apart bearing means, a container cradle permanently coupled to the base by a cradle turn-over means, the cradle has a first and a second spaced apart bearing means engagable respectively with the first and second bearing means on the base to provide two pivotal connections between the base and the cradle allowing said turn-over means to invert the cradle from a first position where a first end of the cradle is ground engaging to a second position where a second end of the cradle is ground engaging, said cradle has an open side to allow a container to be placed in the cradle and has supports to support a container whilst it is inverted.

2. A container turn-over apparatus as claimed in claim 1 wherein the cradle has openable end covers with latching means to releasably retain the end covers in closed condition.

3. A container turn-over apparatus as claimed in claim 2 wherein the latching means for each end cover is operable by an associated latch operating means, the arrangement being such that as said container support approaches the completion of a turn-over action the latch operating means associated with the latch means of the end cover upon which said container support will not stand at the end of a turn-over action releases its associated latch means, and at the commencement of a turn-over action the latch operating means associated with the latch means of the end cover opposite to that upon which said container support stands at the commencement of the turn-over action engages its associated latch means.

4. A turn-over apparatus as claimed in claim 3 where each of said latch operating means subsequent to releasing its associated latch means also opens the end cover having that latch means against the action of means biasing the end cover to closed position and engages its associated latch means after the closure of the end cover having that latch means.

5. A turn-over apparatus as claimed in claim 4 wherein the end covers for the container support are connected by hinges to a body part of said container support.

6. A turn-over apparatus as claimed in claim 4 wherein the latch operating means for each end cover includes a pair of elongated bars respectively slidably mounted on the container support on opposite sides of the container support disposed to either side of the container support open side, said elongated bars project beyond a back of said container support positioned opposite the open side of said container support and terminate in ground engaging ends, the elongated bars each pair are both coupled to an end cover and are respectively coupled through links to latch arms pivotably mounted on that end cover, said latch arms are movable by longitudinal movement of said elongated bars between latched position where they engage co-operating means on the container support and unlatched position, the arrangement being such that as a container support approaches the end of a turn-over movement the ground engaging ends of the longitudinal bars connected to the end cover which will be uppermost when the container support completes its turn-over will engage the ground causing longitudinal movement of said elongated bars from a rest position against a bias towards the rest position, the coupling of those elongated bars to said uppermost end cover is such that longitudinal movement of said elongated bars will not be transferred to said uppermost end cover to open said uppermost end cover until after the longitudinal movement of the elongated bars has unlatched the latch arms, and at the commencement of a container support turn-over the biased return movement of the elongated bars to the rest position as said ground engaging bar ends leave the ground will sequentially allow said uppermost end cover to close before the latching of said latch arms.

7. A turn-over apparatus as claimed in claim 1 wherein each pivotal connection means comprises a pair of pins respectively engagable with and disengagable from a pair of sockets and releasable retainer means mounted on the base means to retain the pins in the sockets of the pivotal connection means about which said container support is to be pivoted.

8. A turn-over apparatus as claimed in claim 7 where the pins of the two pivotal connection means are on the container support and the sockets engagable by the pins are on the base means.

9. A turn-over apparatus as claimed in claim 8 wherein the releasable retainer means for both pivotal connection means are interconnected and operable in unison so that when the retainer means of one pivotal connection means is moved into a pin retaining position the retainer means of the other pivotal connection means is moved into a pin release position.

10. A turn-over apparatus as claimed in claim 9 including security means which when operative prevents and when inoperative permits operation of said interconnected retainer means, said security means being automatically released by the container support when in a mid-position in a turn-over sequence with both pivotal connection means engaged.

11. A turn-over apparatus as claimed in claim 7 wherein the releasable retainer means for both pivotal connection means are interconnected and operable in unison so that when the retainer means of one pivotal connection means is moved into a pin retaining position the retainer means of the other pivotal connection means is moved into a pin release position.

12. A turn-over apparatus as claimed in claim 11 including security means which when operative prevents and when inoperative permits operation of said interconnected retainer means, said security means being automatically released by the container support when in a mid-position in a turn-over sequence with both pivotal connection means engaged.

13. A turn-over apparatus as claimed in claim 12 wherein said security means is a pivoted arm mounted on the base means and biased to position a lug in a notch of said interconnected retainer means and which is held removed from said notch by an actuator fixed to said container support when said container support is in a position where both pivotal connection means are engaged.

14. A turn-over apparatus as claimed in claim 7 having control means for said turn-over means operated by said interconnected retainer means to prevent operation of said turn-over means where a condition exists other than one where one of said pivotal connection means is retained and the other pivotal connection means is not retained.

15. A turn-over apparatus as claimed in claim 14 where said turn-over means comprises a pair of extensible hydraulic members linking the container support to the base means and said control means is a hydraulic fluid flow control valve on the base means operated by a cam fixed to and moving with said interconnected retainer means.

\* \* \* \* \*